United States Patent
Kim et al.

(10) Patent No.: US 11,411,392 B2
(45) Date of Patent: Aug. 9, 2022

(54) POWER CONVERSION CIRCUIT, INVERTER AND METHOD FOR DRIVING INVERTER

(71) Applicant: LG ELECTRONICS INC., Seoul (KR)

(72) Inventors: Jangsik Kim, Seoul (KR); Jaedong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 30 days.

(21) Appl. No.: 16/921,014

(22) Filed: Jul. 6, 2020

(65) Prior Publication Data
US 2021/0057906 A1 Feb. 25, 2021

(30) Foreign Application Priority Data
Aug. 21, 2019 (KR) .................. 10-2019-0102624

(51) Int. Cl.
| | | |
|---|---|---|
| *H02H 9/00* | (2006.01) | |
| *H02M 1/32* | (2007.01) | |
| *H02P 27/06* | (2006.01) | |
| *H02M 7/537* | (2006.01) | |
| *H02M 5/458* | (2006.01) | |

(52) U.S. Cl.
CPC .............. *H02H 9/001* (2013.01); *H02M 1/32* (2013.01); *H02M 5/4585* (2013.01); *H02M 7/537* (2013.01); *H02P 27/06* (2013.01)

(58) Field of Classification Search
CPC ....... H02H 9/001; H02H 7/1216; H02M 1/32; H02M 7/537; H02M 5/4585; H02M 7/062; H02M 1/36; H02M 3/1584; H02M 1/4225; H02M 5/458; H02M 7/5387; H02M 5/44; H02M 7/00; H02M 7/162; H02M 7/1623;
(Continued)

(56) References Cited

U.S. PATENT DOCUMENTS 9,876,438 B2 * 1/2018 Kato .................. H02M 1/36
2003/0137373 A1 * 7/2003 Grumel ................ H01H 71/70
335/68

(Continued)

FOREIGN PATENT DOCUMENTS

| JP | 2003339172 A | 11/2003 |
|---|---|---|
| JP | 2018014813 A | 1/2018 |

OTHER PUBLICATIONS

Attached translated version of Yamda Naoto Foreign patent JP2003339172. (Year: 2003).*

(Continued)

*Primary Examiner* — Shawki S Ismail
*Assistant Examiner* — Htet Z Kyaw
(74) *Attorney, Agent, or Firm* — Dentons US LLP

(57) ABSTRACT

The present disclosure relates to a conversion circuit, an inverter, and a method of driving the inverter, wherein a switch is provided at an input terminal of a direct current (DC) link capacitor, so that power is charged in the DC link capacitor through a switching element at initial driving and charged in the DC link capacitor through a rectifier when a voltage level of the DC link capacitor is equal to or higher than a preset reference level, thereby limiting inrush current caused in the DC link capacitor through the switching element when the inrush current is caused.

13 Claims, 6 Drawing Sheets

(58) Field of Classification Search
CPC ... H02M 7/219; H02M 7/53873; H02P 27/06; H02P 29/027; Y02B 70/10
USPC ................................................ 363/15, 34
See application file for complete search history.

(56) References Cited

U.S. PATENT DOCUMENTS

| | | | | |
|---|---|---|---|---|
| 2013/0336028 | A1* | 12/2013 | Kawamura | H02M 1/4233 363/53 |
| 2015/0280603 | A1* | 10/2015 | Yuasa | H02M 1/36 363/37 |
| 2017/0302081 | A1* | 10/2017 | Walliser | H02M 7/44 |
| 2019/0319529 | A1* | 10/2019 | Yamano | H02M 1/10 |
| 2020/0298722 | A1* | 9/2020 | Smolenaers | B60L 53/24 |
| 2020/0304051 | A1* | 9/2020 | Kouno | H02M 1/32 |

OTHER PUBLICATIONS

Attached translated version of Kawai Tadashi Foreign patent JP2018014813. (Year: 2018).*
Received STIC search report from EIC 2800 searcher Steve Chung, Chickasaw for claim 1 on Jun. 28, 2021. (Year: 2021).*
Received STIC search report from EIC 2800 searcher Angela Brooks for claim 7 on Jun. 30, 2021. (Year: 2021).*
Received STIC search report from EIC 2800 searcher Steve Chung, Chickasaw for claim 14 on Jul. 1, 2021. (Year: 2021).*
Received STIC search report from EIC 2800 searcher Benyam Solomon for claim 20 on Jul. 2, 2021. (Year: 2021).*
Received STIC search report from EIC 2800 searcher Samir Patel for claim 1 on Jan. 27, 2022. (Year: 2022).*
Received STIC search report from EIC 2800 searcher Vaisali Koppolu for claim 7 on Jan. 25, 2022. (Year: 2022).*
Received STIC search report from EIC 2800 searcher Salim Alam for claim 14 on Jan. 24, 2022. (Year: 2022).*

* cited by examiner

POWER CONVERSION CIRCUIT, INVERTER AND METHOD FOR DRIVING INVERTER

CROSS-REFERENCE TO RELATED APPLICATION

Pursuant to 35 U.S.C. § 119(a), this application claims the benefit of the earlier filing date and the right of priority to Korean Patent Application No. 10-2019-0102624, filed on Aug. 21, 2019, the contents of which is incorporated by reference herein in its entirety.

BACKGROUND

1. Technical Field

The present disclosure relates to a power conversion circuit for converting supplied power into alternating current (AC) power, an inverter, and a method for driving the inverter.

2. Description of the Related Art

Technology as a background of the present disclosure relates to an inrush current control of an inverter.

An inverter device (hereinafter, referred to as inverter) for converting input power into alternating current (AC) power charges rectified direct current (DC) power in a DC link capacitor, converts the power charged in the DC link capacitor into AC power through a switching operation of a switching element, and outputs the converted AC power to an object which is to be supplied with the AC power. In the inverter, a power conversion circuit including the DC link capacitor and the switching element may be damaged due to inrush current which is generated at the beginning of charging (initial charging). Therefore, it is necessary to suppress the inrush current at the beginning of charging (initial operation).

In order to limit the inrush current, the related art inverter has mainly used a resistor and a relay. Specifically, a resistor and a power relay or PTC are used in an input circuit to limit inrush current when power is applied, and the power relay is turned on when a DC link voltage of the DC link capacitor is charged up to a ⅔ level. In the related art inrush current limiting method, unnecessary design of a large-capacity relay and a large power resistor is required, causing a cost increase. In addition, a fire risk due to heat generation in the power resistor and the like cause a problem in limiting safety and reliability.

That is, the related art method has failed to effectively/efficiently limit the inrush current, and thereby product stability/reliability has not been guaranteed. Therefore, a method for appropriately limiting inrush current needs to be proposed.

SUMMARY

This disclosure is directed to improving the aforementioned limitations of the related art.

That is, an aspect of the present disclosure is to provide a power conversion circuit, which is capable of improving those limitations of the related art, an inverter, and a method of driving or operating the inverter.

Specifically, an aspect of the present disclosure is to provide a power conversion circuit, which is capable of limiting inrush current effectively or efficiently, an inverter, and a method of driving the inverter.

Another aspect of the present disclosure is to provide a power conversion circuit, which is capable of simply limiting inrush current while facilitating product design, an inverter, and a method of driving the inverter.

In order to solve those problems of the related art, a power conversion circuit, an inverter, and a method for operating the inverter according to the present disclosure are provided to limit inrush current using switching elements of an inverter part.

Specifically, a switch is provided at an input terminal of a direct current (DC) link capacitor, so that power is charged in the DC link capacitor through a switching element at initial driving and charged in the DC link capacitor through a rectifier when a voltage level of the DC link capacitor is equal to or higher than a preset reference level, thereby limiting inrush current caused in the DC link capacitor through the switching element when the inrush current is caused.

That is, in a power conversion circuit, an inverter, and a method for operating the inverter according to the present disclosure, a switch is provided at an input terminal of a direct current (DC) link capacitor, so that inrush current applied to an internal terminal can be limited through a switching element at initial driving and the switch can operate to receive power from a rectifier when a voltage level of the DC link capacitor is equal to or higher than a preset reference level.

The technical features can be applied to a power converter for converting power, an inverter including the power converter, such as an inverter for driving or operating a motor/compressor, an inrush current limiting method of the inverter, and a method for driving or operating the inverter. The present disclosure desires to provide embodiments of a power conversion circuit, an inverter, and a method for driving the inverter for achieving those technical features.

According to one embodiment of the present disclosure to achieve the technical features, there is provided a power conversion circuit which may include a rectifier configured to rectify power supplied from an external power source into a direct current (DC) power, a link part configured to store the DC power input into an input terminal thereof, an inverter part having a plurality of switching element part and configured to convert the DC power into alternating current (AC) power to supply to a target to be supplied with the AC power through a switching operation of the plurality of switching element part, and a switching part configured to connect the input terminal to a supply terminal through which the DC power is supplied from the rectifier or to an output terminal through which the AC power is output from one of the plurality of switching element part, so as to switch a path along which the DC power is input to the link part.

According to one embodiment of the present disclosure to achieve the technical features, there is provided an inverter which may include a rectifier configured to rectify power supplied from an external power source into direct current (DC) power, a link part configured to store the DC power input to an input terminal thereof, an inverter part having a plurality of switching element part and configured to convert the DC power into alternating current (AC) power through a switching operation of the plurality of switching element part to output to a target to be supplied with the AC power, a switching part configured to connect the input terminal to an output terminal through which the AC power is output from one of the plurality of switching element part or to a supply terminal through which the DC power is supplied from the rectifier, and a controller configured to detect a voltage level of the DC power stored in the link part and control an operation of the switching part according to the detected voltage level to switch a path along which the DC power is input to the link part.

According to another embodiment of the present disclosure to achieve the technical features, there is provided an inverter which may include a rectifier configured to rectify power supplied from an external power source into direct current (DC) power, a link part configured to store the DC power input to an input terminal thereof, an inverter part having a plurality of switching element part, and configured to convert the DC power into alternating current (AC) power through a switching operation of the plurality of switching element part to output to a target to be supplied with the AC power, a switching part configured to connect the input terminal to an output terminal through which the AC power is output from one of the plurality of switching element part when a first signal is applied, and connect the input terminal to a supply terminal through which the DC power is supplied from the rectifier when a second signal is applied, and a controller configured to generate the first signal to apply to the switching part when the power supply to the rectifier is started, and generate a second signal to apply to the switching part when it is detected that a voltage level of the DC power stored in the link part is equal to or higher than a preset preference level, so as to switch a path along which the DC power is input to the link part.

According to one embodiment of the present disclosure to achieve the technical features, there is provided a method for driving or operating an inverter, which may include a rectifier configured to rectify power supplied from an external power source into direct current (DC) power, a link part configured to store the DC power input to an input terminal thereof, an inverter part having a plurality of switching element part, and configured to convert the DC power into alternating current (AC) power through a switching operation of the plurality of switching element part to output to a target to be supplied with the AC power, and a switching part configured to connect the input terminal to a supply terminal through which the DC power is supplied from the rectifier, or connect the input terminal to an output terminal through which the AC power is output from one of the plurality of switching element part, so as to switch a path along which the DC power is input to the link part. The method may include starting a power supply to the rectifier, inputting the DC power supplied from the rectifier to the input terminal through one of the plurality of switching element part as the switching part connects the input terminal to the output terminal, storing the DC power in the link part until a voltage level of the DC power stored the link part is higher than or equal to a preset reference level, and inputting the DC power supplied from the rectifier to the input terminal as the switching part connects the input terminal to the supply terminal.

The power conversion circuit, the inverter, and the method for driving the inverter according to the present disclosure may be applied to every power converter, power conversion system, motor control device, and compressor control device and methods for driving and controlling the same, to which the technical features of the present disclosure can be applied.

Embodiments of a power conversion circuit, an inverter, and a method for driving or operating the inverter according to the present disclosure can limit inrush current using switching elements of an inverter part, thereby effectively limiting the inrush current without a large-capacity resistor and relay for limiting the inrush current.

According to those embodiments of the present disclosure, inrush current can be limited by using a switching element of an inverter part, thereby effectively limiting the inrush current in a simple and easy manner.

According to those embodiments of the present disclosure, inrush current can be limited by using a switching element of an inverter part, thereby effectively controlling the inrush current by controlling an operation of a switching element.

Therefore, according to those embodiments of the present disclosure, stability can be ensured during initial driving of a product.

That is, according to those embodiments of the present disclosure, inrush current can be effectively or efficiently limited and controlled in a simple manner, thereby enhancing stability and reliability.

In addition, according to those embodiments of the present disclosure, product design and manufacture can be simplified, thereby effectively reducing costs needed for such design and manufacture.

This may result in improving the limitations of the related art and also enhancing utility, efficiency, stability, reliability and applicability in a field of a power conversion technology.

DETAILED DESCRIPTION OF THE EMBODIMENTS

Figure 1:
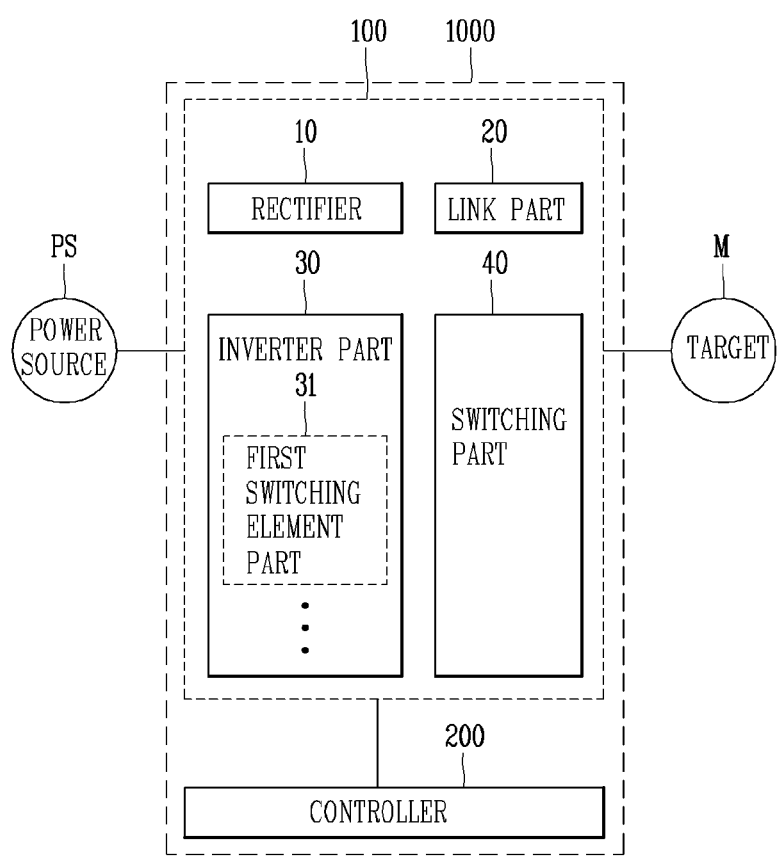
FIG. 1 is a block diagram illustrating configuration of a power conversion circuit and an inverter (or inverter device) according to the present disclosure.

Hereinafter, embodiments disclosed herein will be described in detail with reference to the accompanying drawings, and the same or similar components are denoted by the same reference numerals and redundant description thereof will be omitted. In describing the present invention, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

First, a power conversion circuit (hereinafter, referred to as a conversion circuit) according to the present disclosure will be described.

The conversion circuit denotes a circuit that converts power supplied from an external power source into AC power and outputs the converted AC power to an object to which such AC power is to be supplied.

The conversion circuit may be a circuit which includes a plurality of circuit elements and converts power through the plurality of circuit elements.

The conversion circuit may be a circuit which is included in a motor control device or a compressor control device to convert power, namely, may be configured as a module type.

The conversion circuit may also be a power conversion module included in an inverter device or an inverter to convert power.

As illustrated in FIG. 1, a conversion circuit 100 according to an embodiment is included in an inverter device or inverter 1000 configured to convert power supplied from an external power source (PS) into power for operating or driving an object or target M, such as a motor, a compressor, or the like, to which the converted power is to be supplied, and supply the converted power to the target M to operate or drive the target M. The conversion circuit 100 may include a rectifier 10, a link part 20, an inverter part 30, and a switching part 40.

Figure 2:
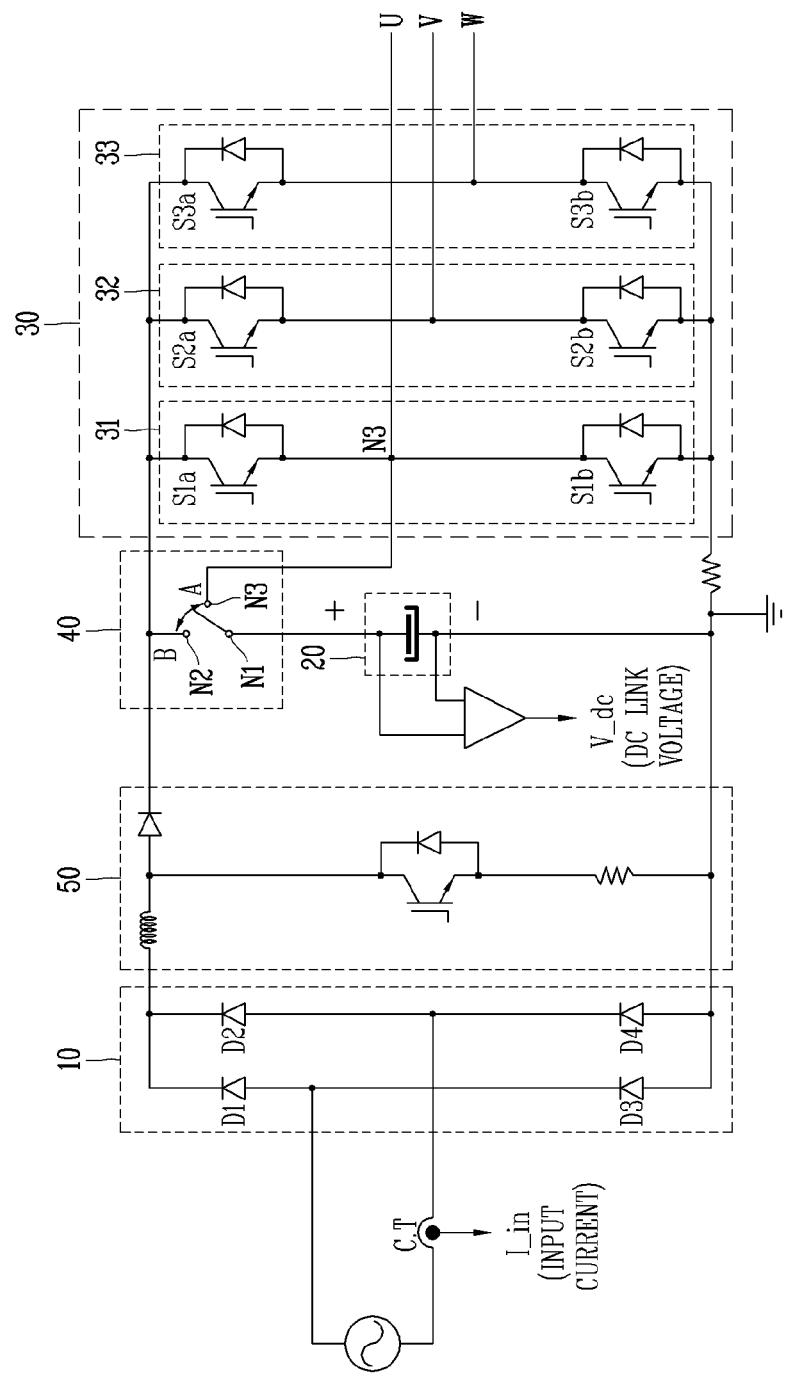
FIG. 2 is a circuit view illustrating a detailed configuration of the power conversion circuit illustrated in FIG. 1.

A detailed configuration of the conversion circuit 100 illustrated in FIG. 1 may be as illustrated in FIG. 2.

As illustrated in FIG. 2, the conversion circuit 100 may include the rectifier 10, the link part 20, the inverter part 30, and the switching part 40, and each of the rectifier 10, the link part 20, the inverter part 30, and the switching part 40 may include at least one circuit element.

The conversion circuit 100 as illustrated in FIG. 2 may be a conversion circuit of a single-phase bridge diode type, and may be a conversion circuit used in products such as refrigerators and washers.

The conversion circuit 100 may further include a conversion unit 50 that includes a plurality of circuit elements to increase or decrease a voltage of power rectified by the rectifier 10, or to remove noise from the power rectified by the rectifier 10.

Figure 3A:
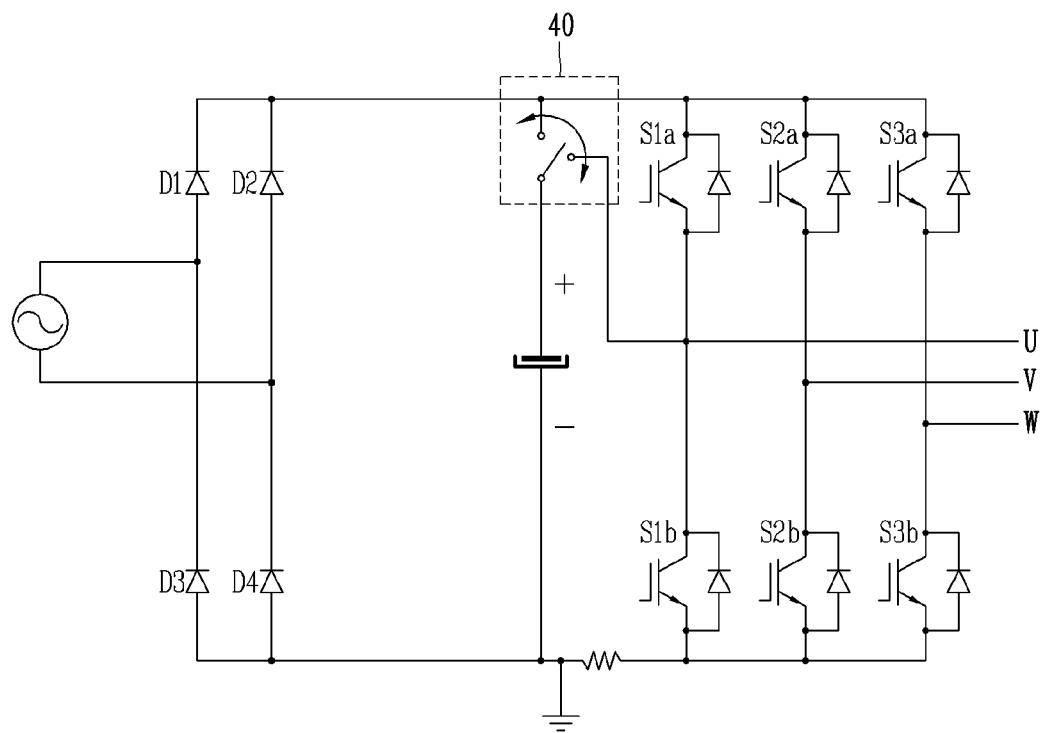
FIG. 3A is a first exemplary view of the power conversion circuit illustrated in FIG. 1.
Figure 3B:
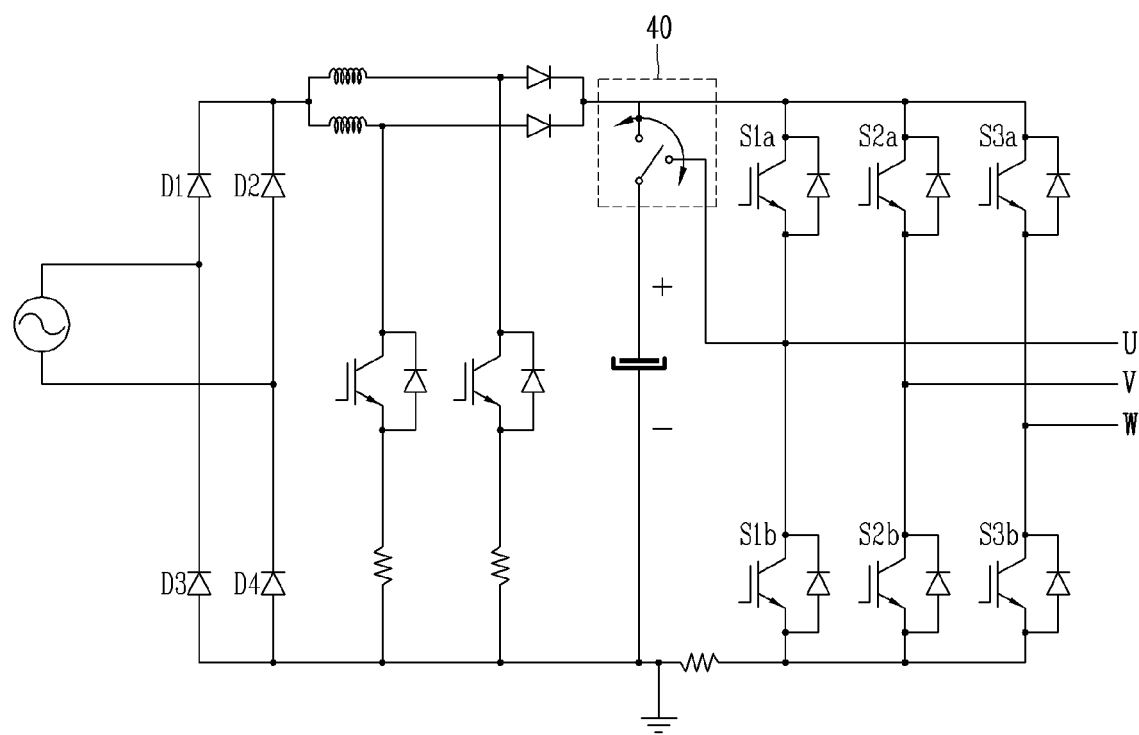
FIG. 3B is a second exemplary view of the power conversion circuit illustrated in FIG. 1.
Figure 3C:
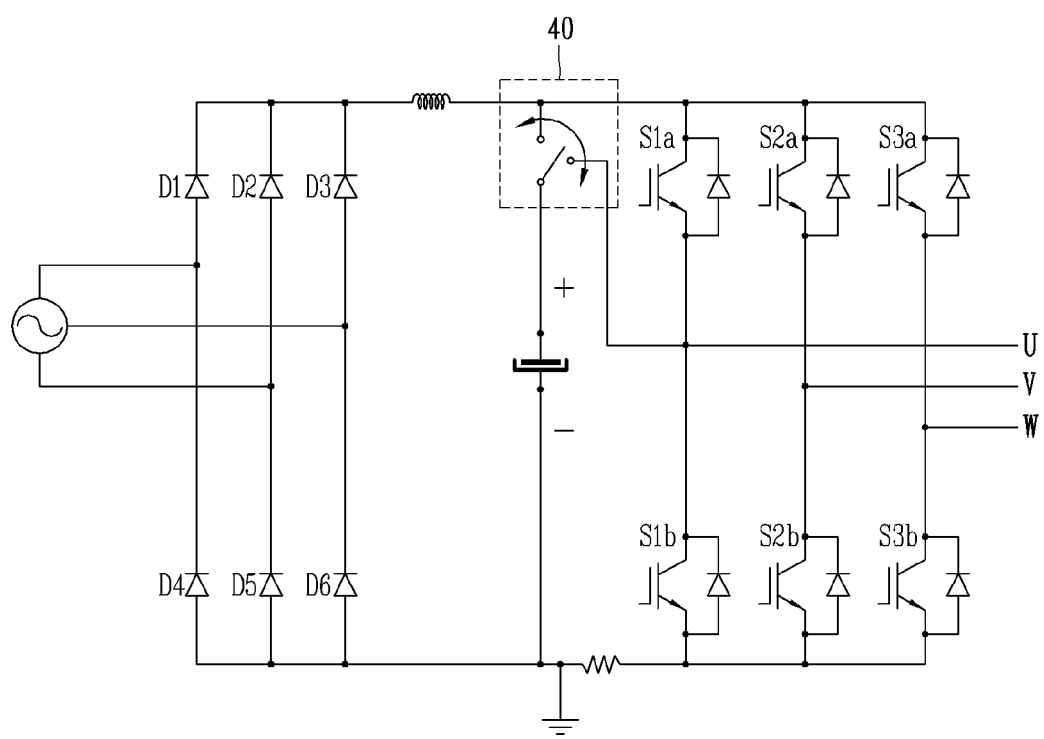
FIG. 3C is a third exemplary view of the power conversion circuit illustrated in FIG. 1.

As such, the conversion circuit 100 including the rectifier 10, the link part 20, the inverter part 30, and the switching part 40 may be configured as a conversion circuit as illustrated in FIGS. 3A to 3C.

The conversion circuit 100 illustrated in FIG. 3A may be a single-phase power factor corrector (PFC) conversion circuit, which is used in products such as a residential air-conditioner (RAC) and the like. The conversion circuit 100 illustrated in FIG. 3B may be a single-phase interleaved PFC conversion circuit, which is used in products such as a solar air-conditioner (SAC) and the like. Also, the conversion circuit 100 illustrated in FIG. 3C may be a three-phase bridge diode conversion circuit, which is used in products such as SAC multi-V and the like.

That is, the conversion circuit 100 may be applied to both single-phase and three-phase conversion circuits.

The rectifier 10 of the conversion circuit 100 may rectify power supplied from the power source PS into DC power.

The rectifier 10 may receive DC or AC power from the power source PS, and rectify the DC or AC power to DC power.

The rectifier 10 may include a plurality of diodes D1 to D4 to rectify power supplied from the power source PS into DC power through the plurality of diodes D1 to D4.

The rectifier 10 may supply the rectified DC power to at least one of the link part 20 and the inverter part 30 through a supply terminal N2.

The link part 20 of the conversion circuit 100 may store the DC power input therein through an input terminal N1.

The link part 20 may include a DC link capacitor. The link part 20 may store the DC power in the DC link capacitor to transfer to the inverter part 30.

In the conversion circuit 100, the inverter part 30 may include a plurality of switching element part 31, 32, and 33. The inverter part 30 may convert the DC power into AC power through a switching operation of the plurality of switching element part 31, 32, and 33, and output the converted AC power to the target M.

The plurality of switching element part 31, 32, and 33 may be at least two in number.

For example, the inverter part may include three switching element part to convert power of one of three-phase power (U, V, and W).

The plurality of switching element part 31, 32, and 33 may include switching elements S1$a$-S1$b$, S2$a$-S2$b$ and S3$a$-S3$b$, respectively. The plurality of switching element part 31, 32, and 33 may convert the DC power into AC power through the plurality of switching elements S1$a$-S1$b$, S2$a$-S2$b$ and S3$a$-S3$b$, respectively, and output the AC power to the target M.

Here, the switching element may be a switching element included in power conversion means such as IGBT, MOSFET.

Each of the plurality of switching element part 31, 32, and 33 may include a pair of switching elements S1$a$-S1$b$ and S2$a$-S2$b$ and S3$a$-S3$b$ each including an upper-arm switching element S1$a$, S2$a$, S3$a$ and a lower-arm switching element S1$b$, S2$b$, S3$b$.

That is, the first switching unit 31 may include the first upper-arm switching element S1$a$ and the first lower-arm switching element S1$b$, and the second switching unit 32 may include the second upper-arm switching element S2$a$ and the second lower-arm switching element S1$b$, and the third switching unit 33 may include the third upper-arm switching element S3$a$ and the third lower-arm switching element S3$b$.

The inverter part 30 may convert the DC power supplied from the link part 20 into AC power through the switching operation of the plurality of switching element part 31, 32, and 33, and supply the AC power to the target M through respective output terminals.

The output terminal may be a node to which the upper-arm switching element S1$a$, S2$a$, S3$a$ and the lower-arm switching element S1$b$, S2$b$, S3$b$ are connected.

For example, in the first switching unit 31, the output terminal may be a node N3 to which the first upper-arm switching element S1$a$ and the first lower-arm switching element S1$b$ are connected so that the AC power is output to the target M.

The switching part 40 of the conversion circuit 100 may connect the input terminal N1 to the supply terminal N2 through which the DC power is supplied from the rectifier 10, or to the output terminal N3 through which the AC power is output from one of the plurality of switching element part 31, 32, and 33, thereby switching a path along which the DC power is input to the link part 20.

The switching part 40 may be configured as a transfer switch for switching connection among at least three nodes, and connect the input terminal N1 to the supply terminal N2 or the output terminal N3.

For example, in a state A, the switching part 40 may connect the input terminal N1 to the output terminal N3. When the state A is switched to a state B, the switching part 40 may connect the input terminal N1 to the supply terminal N2.

The switching part 40 may normally connect the input terminal N1 to the output terminal N3 so that the DC power supplied from the rectifier 10 is input to the input terminal N1 via one of the plurality of switching element part 31, 32, and 33. On the other hand, during an operation, the switching part 40 may connect the input terminal N1 to the supply terminal N2 so that the DC power supplied from the rectifier 10 is input to the input terminal N1.

That is, normally, the switching part 40 may connect the input terminal N1 to the output terminal N3. When the switching part 40 operates to connect the input terminal N1 to the supply terminal N2, the path along which the DC power is input to the link part 20 may be switched.

Figure 4:
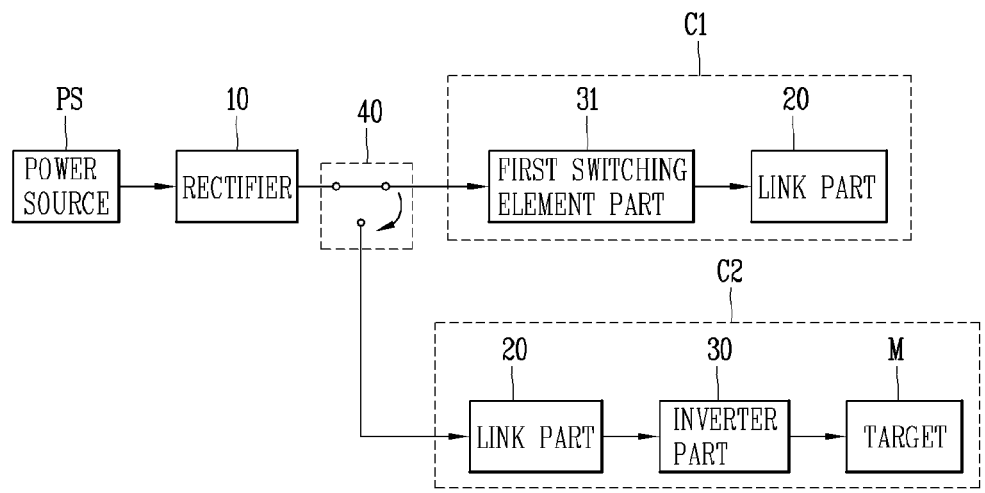
FIG. 4 is a block diagram illustrating a power supply process in a power conversion circuit and an inverter according to the present disclosure.

As such, the conversion circuit 100 in which the switching part 40 switches the path along which the DC power is input to the link part 20 may allow power supply as illustrated in FIG. 4.

As illustrated in FIG. 4, in the conversion circuit 100 with the configuration, when the switching part 40 connects the input terminal N1 to the output terminal N3 (C1), namely, in a normal state, DC power rectified in the rectifier 10 may be supplied to the first switching unit 31. The DC power passed through the first switching unit 31 is input to the input terminal N1 via the output terminal N3, and stored in the link part 20. On the other hand, when the switching part 40 connects the input terminal N1 to the supply terminal N2 (C2), namely, in an operating state (during an operation), the DC power rectified in the rectifier 10 may be input to the input terminal N1 to be stored in the link part 20. The DC power stored in the link part 20 may be supplied to the inverter part 30. The DC power may then be converted into AC power through a switching operation of the inverter part 30, so that the AC power can be supplied to the target M. Accordingly, the target M can be driven.

That is, in the normal state, the input terminal N1 may be connected to the output terminal N3 due to a non-operation of the switching part 40. Accordingly, the DC power can be stored in the link part 20 via the first switching unit 31. On the other hand, when the switching part 40 performs the switching operation, the input terminal N1 may be connected to the supply terminal N2, so that the DC power recited in the rectifier 10 can be stored directly in the link part 20.

Here, the normal state may correspond to an initial driving time at which power starts to be supplied to the conversion circuit 100 or the inverter 1000 including the conversion circuit 100, and the operating state may correspond to an initial driving-completed state.

Figure 5:
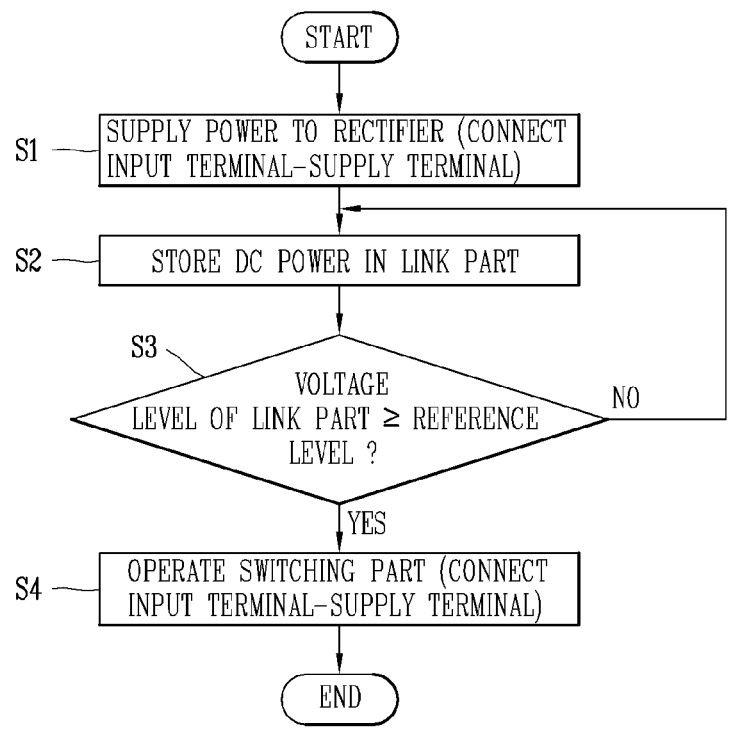
FIG. 5 is a flowchart illustrating operations of a power conversion circuit and an inverter according to the present disclosure.

As described above, detailed operations of the switching part 40 for connecting the input terminal N1 to the output terminal N3 by non-operation in the normal state and connecting the input terminal N1 to the supply terminal N2 in the operating state may be shown in FIG. 5.

As illustrated in FIG. 5, after power is supplied to the rectifier 10 (S1), the supplied power is rectified into DC power in the rectifier 10. The rectified DC power is stored in the link part 20 through a connection between the input terminal N1 and the output terminal N3 made by the switching part 40 (S2). The switching part 40 may maintain the connection between the input terminal N1 and the output terminal N3 until before a voltage level of the stored DC power is equal to or higher than a preset reference level. When the voltage level of the stored DC power is equal to or higher than the preset reference level, the switching part 40 may perform a switching operation to connect the input terminal N1 to the supply terminal N2 (S4).

That is, in the state where the switching part 40 connects the input terminal N1 to the output terminal N3, the DC power may be supplied to the rectifier 10 (S1). Afterward, the DC power rectified in the rectifier is stored in the link part 20 via the first switching unit 31 (S2). During the storage, when the voltage level is equal to or higher than the preset reference level (S3), the switching part 40 may perform the switching operation so that the input terminal N1 is connected to the supply terminal N2 (S4).

Accordingly, the switching part 40 may connect the input terminal N1 to the output terminal N3 until before the voltage level becomes higher than or equal to the reference level from a time point when the power supply is carried out after initial driving, so that the DC power is stored in the link part 20 via the first switching unit 31. This may result in limiting inrush current generated at the initial driving. When the voltage level is equal to or higher than the reference level, the switching part 40 may connect the input terminal N1 to the supply terminal N2, thereby enabling power conversion and supply of the conversion circuit 100.

The reference level may be a level of a predetermined ratio with respect to a rated voltage of the link part 20.

For example, the reference level may be set to correspond to two thirds of the rated voltage.

In this case, when the voltage level is equal to or higher than ⅔ of the rated voltage, the switching part 40 may perform the switching operation to connect the input terminal N1 to the supply terminal N2.

The conversion circuit 100 having such configuration may also be included in an inverter or inverter device according to the present disclosure.

Hereinafter, an inverter according to the present disclosure will be described, but redundant description will be omitted if possible.

The inverter 1000 may be a device which includes the conversion circuit 100 as illustrated in FIG. 1, and configured to operate or drive the target M, such as a motor, a compressor or the like, by supplying power to the target M.

The inverter 1000 may be an inverter module included in the target M, or may be an inverter module separate from the target M.

The inverter 1000 may include the rectifier 10, the link part 20, the inverter part 30, the switching part 40, and a controller 200 that detects a voltage level of the DC power stored in the link part 20 and controls the operation of the switching part 40 according to the detected voltage level, so as to switch (change) a path along which the DC power is input to the link part 20.

Here, the rectifier 10, the link part 20, the inverter part 30, and the switching part 40 may construct the conversion circuit 100.

That is, the inverter 1000 may be a device that includes the conversion circuit 100 and the controller 200 to drive the target M.

In the inverter 1000, the switching part 40 may perform a switching operation under the control of the controller 200 to connect the input terminal N1 to the output terminal N3 or to the supply terminal N2.

The switching part 40 may perform the switching operation from an initial state where it connects the input terminal N1 to the output terminal N3 into a switching state where it connects the input terminal N1 to the supply terminal N2.

That is, the switching part 40 may connect the input terminal N1 to the output terminal N3 at the beginning, while connecting the input terminal N1 to the supply terminal N2 when the switching is performed by the controller 200.

Accordingly, in the inverter 1000, the input terminal N1 can be connected to the output terminal N3 at the initial driving for driving or operating the object M, and can be connected to the supply terminal N2 when the switching operation of the switching part 40 is controlled by the controller 200 after the initial driving.

The controller 200 may be a control device that controls the conversion circuit 100 in the inverter 100.

The controller 200 may control power conversion and supply of the conversion circuit 100 by controlling the switching operation of the inverter part 30 and the switching operation of the switching part 40.

The controller 200 may control the operation of the switching part 40 as illustrated in FIG. 5 to allow the power supply of the conversion circuit 100 as illustrated in FIG. 4.

The controller 200 may detect the voltage level of the DC power stored in the link part 20 and control the switching operation of the switching part 40 according to the voltage level, so that the switching part 40 can connect the input terminal N1 to the output terminal N3 or to the supply terminal N2.

After the power supply to the rectifier 10 is started in response to the initial driving of the inverter 1000 (S1), when the switching part 40 is in the initial state, namely, connects the input terminal N1 to the output terminal N3, the controller 200 may detect the voltage level while the DC power is stored in the link part 20 via the first switching unit 31 (S2), and compare the detected voltage level with the reference level (S3).

The controller 200 may deactivate (or may not operate) the switching part 40 to maintain the initial state when the voltage level is lower than the reference level (S2), and may activate (or operate) the switching part 40 to be switched to the switching state when the voltage level is equal to or higher than the reference level (S4).

The controller 200 may not operate or drive the switching part 40 until before the voltage level corresponds to the reference level or greater from after the power supply to the rectifier 10 is started, and operate or drive the switching part 40 when the voltage level is equal to or higher than the reference level.

That is, the controller 200 may not operate the switching part 40 until before the voltage level is equal to or higher than the reference level from after the power supply to the rectifier 10 is started, so that the input terminal N1 can be connected to the output terminal N3. Accordingly, the DC power can be stored in the link part 20 via the first switching unit 31, thereby limiting the inrush current generated at the initial driving. When the voltage level becomes equal to, or higher than the reference level the controller 200 may operate or drive the switching part 40 to connect the input terminal N1 to the supply terminal N2, thereby enabling the power conversion and supply of the conversion circuit 100.

On the other hand, in the inverter 1000, the switching part 40 may connect the input terminal N1 to the output terminal N3 through which the AC power is output from one of the plurality of switching element part 31, 32, and 33 when a first signal is applied, while connecting the input terminal N1 to the supply terminal N2 through which the DC power is supplied from the rectifier 10 when a second signal is applied.

That is, the switching part 40 may connect the input terminal N1 to the output terminal N3 or to the supply terminal N2 by operating according to a control signal applied from the controller 200.

Here, the first signal and the second signal may be control signals generated by the controller 200.

When the first signal is applied, the switching part 40 may connect the input terminal N1 to the output terminal N3 so that the DC power supplied from the rectifier 10 can be input to the input terminal N1 via one of the plurality of switching element part 31, 32, and 33.

That is, when the first signal is applied from the controller 200, the switching part 40 may not operate and accordingly connect the input terminal N1 to the output terminal N3 of the first switching unit 31.

When the second signal is applied, the switching part 40 may connect the input terminal N1 to the supply terminal N2 so that the DC power supplied from the rectifier N1 can be input to the input terminal N2.

That is, the switching part 40 can perform the switching operation when the second signal is applied from the controller 200, so that the input terminal N1 can be connected to the supply terminal N2.

As such, in the case where the switching part 40 performs the switching operation in response to a control signal applied from the controller 200, the controller 200 may generate the first signal to apply to the switching part when the power supply to the rectifier 10 is started, and then detect the voltage level of the DC power stored in the link part 20. When it is detected that the voltage level of the DC power stored in the link part 20 is equal to or higher than the reference level, the controller 200 may generate the second signal to apply to the switching part 40, so as to switch the path along which the DC power is input to the link part 20.

Here, the first signal may be a signal for controlling the switching part 40 to not operate, and the second signal may be a signal for controlling the switching part 40 to perform a switching operation.

That is, the controller 200 may generate the first signal to apply to the switching part 40 so that the switching part 40 does not operate until the voltage level is equal to or higher than the reference level after the power supply to the rectifier 10 is started, and generate the second signal to apply to the switching part 40 so that the switching part 40 can perform the switching operation from when the voltage level is equal to or higher than the reference level.

Accordingly, the generation and application of the first signal for deactivating (or not operating) the switching part 40 may be carried out until the voltage level is equal to or higher than the reference level after the power supply to the rectifier 10 is started. Accordingly, the input terminal N1 can be connected to the output terminal N3 such that the DC power can be stored in the link part 20 via the first switching unit 31, thereby limiting the inrush current generated at the initial driving. Also, the generation and operation of the second signal for causing the switching operation of the switching part 40 may be carried out from when the voltage level is equal to or higher than the reference level. Accordingly, the input terminal N1 can be connected to the supply terminal N2 so that the power conversion and supply of the conversion circuit 100 can be allowed.

The inverter 1000 having such configuration may be applied to a method of driving or operating an inverter according to the present disclosure, or the method of driving the inverter may be applied to the inverter 1000.

Hereinafter, a method of driving an inverter (hereinafter, referred to as a driving method) according to the present disclosure will be described, but the redundant description will be omitted if possible.

The driving method may be a method of driving or operating the inverter 1000 including the rectifier 10, the link part 20, the inverter part 30, and the switching part 40 as illustrated in FIG. 1. For example, the driving method may be an initial driving method of the inverter 1000.

That is, the driving method may be an initial driving method of the conversion circuit 100 described above, or an initial driving method of the inverter 1000 including the conversion circuit 100.

Accordingly, the conversion circuit 100 and the inverter 1000 may be initially driven according to the driving method.

The driving method may be a method in which the controller 200 of the inverter 1000 controls the initial driving of the inverter 1000.

The driving method may also be a method of limiting inrush current of the inverter 1000 including the conversion circuit 100.

That is, the driving method may be an inrush current limiting method of the conversion circuit 100 described above, or an inrush current limiting method of the inverter 1000 including the conversion circuit 100.

Figure 6:
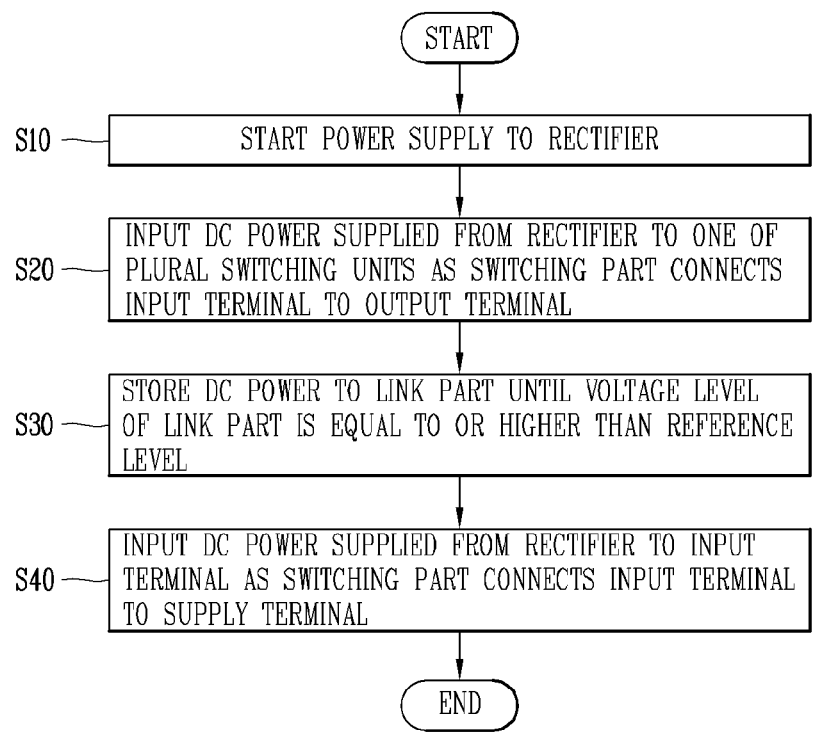
FIG. 6 is a flowchart illustrating a method of operating or driving an inverter according to the present disclosure.

The driving method, as illustrated in FIG. 6, may include starting to supply power to the rectifier 10 (S10), inputting DC power supplied from the rectifier 10 to the input terminal N1 via one of the plurality of switching element part 31, 32, and 33 as the switching part 40 connects the input terminal N1 to the output terminal N3 (S20), storing the DC power in the link part 20 until a voltage level of the link part 20 is equal to or higher than the reference level (S30), and inputting the DC power supplied from the rectifier 10 to the input terminal N1 as the switching part 40 connects the input terminal N1 to the supply terminal N2 (S40).

That is, the inverter 1000 may be initially driven in sequence of starting to supply power to the rectifier 10 (S10), inputting DC power supplied from the rectifier 10 to the input terminal N1 via one of the plurality of switching element part 31, 32, and 33 as the switching part 40 connects the input terminal N1 to the output terminal N3 (S20), storing the DC power in the link part 20 until a voltage level of the link part 20 is equal to or higher than the reference level (S30), and inputting the DC power supplied from the rectifier 10 to the input terminal N1 as the switching part 40 connects the input terminal N1 to the supply terminal N2 (S40).

In addition, the inverter 1000 may limit the inrush current in sequence of starting to supply power to the rectifier 10 (S10), inputting DC power supplied from the rectifier 10 to the input terminal N1 via one of the plurality of switching element part 31, 32, and 33 as the switching part 40 connects the input terminal N1 to the output terminal N3 (S20), storing the DC power in the link part 20 until a voltage level of the link part 20 is equal to or higher than the reference level (S30), and inputting the DC power supplied from the rectifier 10 to the input terminal N1 as the switching part 40 connects the input terminal N1 to the supply terminal N2 (S40).

Accordingly, the controller 200 can control the conversion circuit 100 in sequence of starting to supply power to the rectifier 10 (S10), inputting DC power supplied from the rectifier 10 to the input terminal N1 via one of the plurality of switching element part 31, 32, and 33 as the switching part 40 connects the input terminal N1 to the output terminal N3 (S20), storing the DC power in the link part 20 until a voltage level of the link part 20 is equal to or higher than the reference level (S30), and inputting the DC power supplied from the rectifier 10 to the input terminal N1 as the switching part 40 connects the input terminal N1 to the supply terminal N2 (S40).

The starting of the power supply to the rectifier 10 (S10) may be a step of starting the operation of the inverter 1000.

In step S10 of starting the power supply to the rectifier 10, the controller 200 may apply the first signal to the switching part 40 so that the switching part 40 can connect the input terminal N1 to the output terminal N3.

In step S20 of inputting the DC power supplied from the rectifier 10 to the input terminal N1 via one of the plurality of switching element part 31, 32, and 33 may be a step of limiting the inrush current after the initial operation of the inverter 1000 is started.

In step S20 of inputting the DC power supplied from the rectifier 10 to the input terminal N1 via one of the plurality of switching element part 31, 32, and 33, the DC power may be input to the input terminal N1 of the link part 10 via the output terminal N3 of the first switch unit 31 of the plurality of switching element part 31, 32, and 33, so as to be stored in the link part 20.

The controller 200 may detect the voltage level of the link part 20 from the step S20 of inputting the DC power supplied from the rectifier 10 to the input terminal N1 via one of the plurality of switching element part 31, 32, and 33 to the step S30 of storing the DC power in the link part 20 until the voltage level of the link part 20 is equal to or higher than the reference level.

Accordingly, the switching part 40 may not operate until the voltage level is equal to or higher than the reference level, so as to be kept in the initial state of connecting the input terminal N1 to the output terminal N3.

When the voltage level becomes higher than or equal to the reference level in the step S30 of storing the DC power in the link part 20 until the voltage level of the link part 20 becomes higher than or equal to the reference level, the controller 200 may apply the second signal to the switching part 40 to control the switching part 40 to perform a switching operation.

Accordingly, the switching part 40 may connect the input terminal N1 to the supply terminal N2 so that the DC power supplied from the rectifier 10 is input to the input terminal N1 (S40).

In the step S40 of inputting the DC power supplied from the rectifier 10 to the input terminal N1 as the switching part 40 connects the input terminal N1 to the supply terminal N2, the power conversion and supply of the conversion circuit 100 can be carried out through the connection between the input terminal N1 and the supply terminal N2.

The driving method as described above may be applied to control algorithms and programs, such as applications, software, etc. for controlling the operation of the inverter 1000 or the controller 200 included in the inverter 1000.

Although specific embodiments of the present disclosure have been described so far, it will be apparent that various modifications can be made without departing from the scope of the present disclosure. Therefore, the scope of the present disclosure should not be limited to the described embodiments, but should be determined not only by the claims below but also by the equivalents of the claims.

As described above, although the present disclosure has been described by way of limited embodiments and drawings, it should be understood that the present disclosure is not limited to the above-described embodiments and various modifications and changes are made by those skilled in the art to which the present disclosure pertains. Accordingly, the scope of the present disclosure should be understood only by the claims set forth below, and all equivalent or equivalent modifications thereof will belong to the scope of the present disclosure.

What is claimed is:

1. A conversion circuit of an inverter, the conversion circuit comprising:
a rectifier configured to convert power from an external source into direct current (DC) power and to provide the DC power to a supply terminal;
a link part configured to store the DC power supplied to an input terminal thereof;
an inverter part, having a plurality of switching element parts, configured to convert the DC power into alternating current (AC) power through a switching operation of the plurality of switching element parts and to output the AC power to a target; and
a switching part configured to connect the input terminal to the supply terminal, or to connect the input terminal to an output terminal through which the AC power is output from one of the plurality of switching element parts during the switching operation, selectively switching a path along which the DC power is input to the link part,
wherein the switching part is a single changeover switch,
wherein the switching part connects the input terminal to the output terminal in a normal state such that the DC power supplied from the rectifier is input to the input terminal via one of the plurality of switching element parts, and connects the input terminal to the supply terminal during an operation such that the DC power supplied from the rectifier is input directly to the input terminal, and
wherein the switching part connects the input terminal to the output terminal until a voltage level of the DC power stored in the link part meets or exceeds a preset reference level after the external source is connected to the rectifier, and is switched to connect the input terminal to the supply terminal when the voltage level meets or exceeds the preset reference level.

2. The conversion circuit of claim 1, wherein each of the plurality of switching element parts comprises a pair of switching elements including an upper-arm switching element and a lower-arm switching element.

3. The conversion circuit of claim 2, wherein the output terminal is a node to which the upper-arm switching element and the lower-arm switching element are connected.

4. The conversion circuit of claim 1, wherein the preset reference level is a level of a predetermined rate with respect to a rated voltage of the link part.

5. An inverter comprising:
a rectifier configured to convert power from an external source into direct current (DC) power and to provide the DC power to a supply terminal;
a link part configured to store the DC power supplied to an input terminal thereof;
an inverter part, having a plurality of switching element parts, configured to convert the DC power into alternating current (AC) power through a switching operation of the plurality of switching element parts and to output the AC power to a target;
a switching part configured to connect the input terminal to an output terminal through which the AC power is output from one of the plurality of switching element parts during the switching operation or to the supply terminal; and
a controller configured to detect a voltage level of the DC power stored in the link part and to control an operation of the switching part according to the detected voltage level,
wherein the controller selectively switches a path along which the DC power is input to the link part,
wherein the switching part is a single changeover switch,
wherein the switching part is switched from an initial state of connecting the input terminal to the output terminal into a switching state of connecting the input terminal to the supply terminal,
wherein the controller does not operate the switching part to maintain the initial state when the voltage level is below a preset reference level and operates the switching part to be switched to the switching state when the voltage level meets or exceeds the preset reference level, and
wherein the controller does not operate the switching part until the voltage level meets or exceeds the preset reference level after the external source is connected to the rectifier, and operates the switching part when the voltage level meets or exceeds the preset reference level.

6. The inverter of claim 5, wherein each of the plurality of switching element parts comprises a pair of switching elements including an upper-arm switching element and a lower-arm switching element.

7. The inverter of claim 6, wherein the output terminal is a node to which the upper-arm switching element and the lower-arm switching element are connected.

8. The inverter of claim 5, wherein the preset reference level is a level of a predetermined rate with respect to a rated voltage of the link part.

9. An inverter comprising:
a rectifier configured to convert power from an external source into direct current (DC) power and to provide the DC power to a supply terminal;
a link part configured to store the DC power supplied to an input terminal thereof;
an inverter part, having a plurality of switching element parts, configured to convert the DC power into alternating current (AC) power through a switching operation of the plurality of switching element parts and to output the AC power to a target;
a switching part configured to connect the input terminal to an output terminal through which the AC power is output from one of the plurality of switching element parts during the switching operation when a first signal is applied, and connect the input terminal to the supply terminal when a second signal is applied; and
a controller configured to generate the first signal to apply to the switching part when the external source is connected to the rectifier, and to generate a second signal to apply to the switching part when the controller detects that a voltage level of the DC power stored in the link part meets or exceeds a preset reference level, selectively switching a path along which the DC power is input to the link part,
wherein the switching part is a single changeover switch,
wherein the switching part connects the input terminal to the output terminal, when the first signal is applied, supplying the DC power from the rectifier to the input terminal via one of the plurality of switching element parts, and wherein the switching part connects the input terminal to the supply terminal, when the second signal is applied, supplying the DC power from the rectifier to the input terminal.

10. The inverter of claim 9, wherein each of the plurality of switching element parts comprises a pair of switching elements including an upper-arm switching element and a lower-arm switching element.

11. The inverter of claim 10, wherein the output terminal is a node to which the upper-arm switching element and the lower-arm switching element are connected.

12. The inverter of claim 9, wherein the preset reference level is a level of a predetermined rate with respect to a rated voltage of the link part.

13. A method for driving an inverter comprising a rectifier configured to convert power from an external source into direct current (DC) power and to provide the DC power to a supply terminal, a link part configured to store the DC power supplied to an input terminal thereof, an inverter part, having a plurality of switching element parts, configured to convert the DC power into alternating current (AC) power through a switching operation of the plurality of switching element parts and to output the AC power to a target, and a switching part configured to connect the input terminal to the supply terminal, or to connect the input terminal to an output terminal through which the AC power is output from one of the plurality of switching element parts during the switching operation, selectively switching a path along which the DC power is input to the link part, the method comprising:

connecting the external source to the rectifier;

inputting the DC power from the rectifier to the input terminal via one of the plurality of switching element parts as the switching part connects the input terminal to the output terminal;

storing the DC power in the link part until a voltage level of the DC power stored the link part meets or exceeds a preset reference level; and inputting the DC power from the rectifier directly to the input terminal as the switching part connects the input terminal to the supply terminal, wherein the switching part is a single changeover switch, wherein the switching part connects the input terminal to the output terminal in a normal state such that the DC power supplied from the rectifier is input to the input terminal via one of the plurality of switching element parts, and connects the input terminal to the supply terminal during an operation such that the DC power supplied from the rectifier is input directly to the input terminal, and wherein the switching part connects the input terminal to the output terminal until a voltage level of the DC power stored in the link part meets or exceeds a preset reference level after the external source is connected to the rectifier, and is switched to connect the input terminal to the supply terminal when the voltage level meets or exceeds the preset reference level.

* * * * *